United States Patent [19]

Forbes et al.

[11] Patent Number: 5,322,260

[45] Date of Patent: Jun. 21, 1994

[54] SOLENOID VALVE

[75] Inventors: Terry L. Forbes, Dixon; John R. Connolly, Rock Falls, both of Ill.

[73] Assignee: Borg-Warner Automotive, Inc., Sterling Heights, Mich.

[21] Appl. No.: 66,955

[22] Filed: May 24, 1993

[51] Int. Cl.⁵ .............................................. F16K 31/06
[52] U.S. Cl. .......................... 251/129.14; 251/129.18; 251/368
[58] Field of Search .................. 251/129.14, 129.18, 251/368

[56] References Cited

U.S. PATENT DOCUMENTS

| | | |
|---|---|---|
| 3,731,880 | 5/1973 | Williams .................. 251/129.14 X |
| 4,099,701 | 7/1978 | Berger . |
| 4,513,701 | 4/1985 | Sternberg et al. ............ 251/337 X |
| 4,556,085 | 12/1985 | Warrick . |
| 4,570,904 | 2/1986 | Mullally . |
| 4,595,035 | 6/1986 | Warrick . |
| 4,617,968 | 10/1986 | Hendrixon . |
| 4,674,536 | 6/1987 | Warrick . |
| 4,753,263 | 6/1988 | Warrick . |
| 4,765,587 | 8/1988 | Cummins . |
| 4,863,142 | 9/1989 | Hendrixon et al. . |
| 4,893,645 | 1/1990 | Augustinas et al. . |
| 5,076,499 | 12/1991 | Cranford .................. 251/129.14 X |
| 5,207,410 | 5/1993 | Wakeman .................. 251/129.15 |
| 5,238,224 | 8/1993 | Horsting .................. 251/129.15 X |

Primary Examiner—Arnold Rosenthal
Attorney, Agent, or Firm—Harness Dickey & Pierce

[57] ABSTRACT

A solenoid valve has a two piece housing which is made from a hollow cylindrical body and a powdered metal cover. The body is projection welded to the cover. The cover has an induction hardened valve seat and a pair of mounting holes to secure the valve in place. A coil assembly is disposed within the hollow cylindrical body and a two piece armature is disposed within an axial bore of the coil assembly. The upper armature is threadably engaged with an end cover for adjustment and a coil spring is located between the upper and lower armatures to bias the lower armature towards the cover. A ball is located between the lower armature and the cover and the coil spring engages the ball with the valve sleeve. When the coil is de-energized, the valve is closed by virtue of the ball being urged against the valve seat by the coil spring. When the coil is energized the lower armature and ball are magnetically attracted to the upper armature permitting flow through the cover, through the body and out a plurality of holes in the body.

20 Claims, 2 Drawing Sheets

SOLENOID VALVE

FIELD OF THE INVENTION

The present invention relates to solenoid valves. More particularly, the present invention relates to solenoid valves which are used to control an automatic transmission with the solenoid valves operating in either an on/off mode or in a pulse width modulated mode.

BACKGROUND AND SUMMARY OF THE INVENTION

The valves of a hydraulic transmission of the type used in vehicles can be controlled by a microprocessor which includes sensors that sense variables such as road speed, throttle position, engine RPM, and the like. These microprocessors function to provide pulses to pulse width modulated valves as well as power to on/off valves at the appropriate time. These valves can control spool valves for operating clutches in the transmission or they can control the clutches directly. Pulse width modulated valves are normally used when it is desirable to accurately control the pressure of the fluid being supplied through the valve.

Prior art solenoid valves are well known in the art and are able to adequately function in an automotive transmission in both a pulse width modulated mode and an on/off mode. Prior art valves generally have a single piece housing which contains a coil. A pole member extends into the housing through the center of the coil. A ball in included which is movable with the application of power to the coil to open or close fluid passageways to control the flow of fluid. The housing associated with these prior art solenoid valves is generally a machined forging or extrusion. The machining of this forging or extrusion adds a significant cost to the manufacturing costs of the solenoid valve. Accordingly, what is needed is a solenoid valve which incorporates a lower cost method of manufacturing the housing and other components of the valve. The solenoid valve must still meet all the performance characteristics of the valves manufactured with one piece machined housings.

The present invention provides the art with a solenoid valve which has a two piece outer housing which is projection welded together. The cover of the valve is a powdered metal component having an inductioned hardened valve seat. A tubular shaped body is projection welded to the cover to form the two piece outer housing. The internal components of the solenoid are assembled into the body and tabs extending from the body are rolled over to maintain the internal components of the valve within the assembly. The air gap necessary for the operation of the solenoid is adjusted using an externally accessed threaded member which is staked in place to maintain the air gap once the proper gap has been set.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DESCRIPTION OF THE PREFERRED EMBODIMENT

The solenoid valve of the present invention can be used in either a pulse width modulated mode or it can be used in an on/off mode. While not to be limited to automotive applications, the solenoid valve of the present invention can be utilized within a control system wherein a microprocessor receives signals from various sensors positioned in a vehicle which monitor functions such as vehicle speed, engine throttle position, and engine RPM. The microprocessor will then control the solenoid valve or valves to function as pilot valves to control pilot operated spool valves or function as control valves acting directly on hydraulic components in an automotive transmission such as a clutch.

Figure 1:
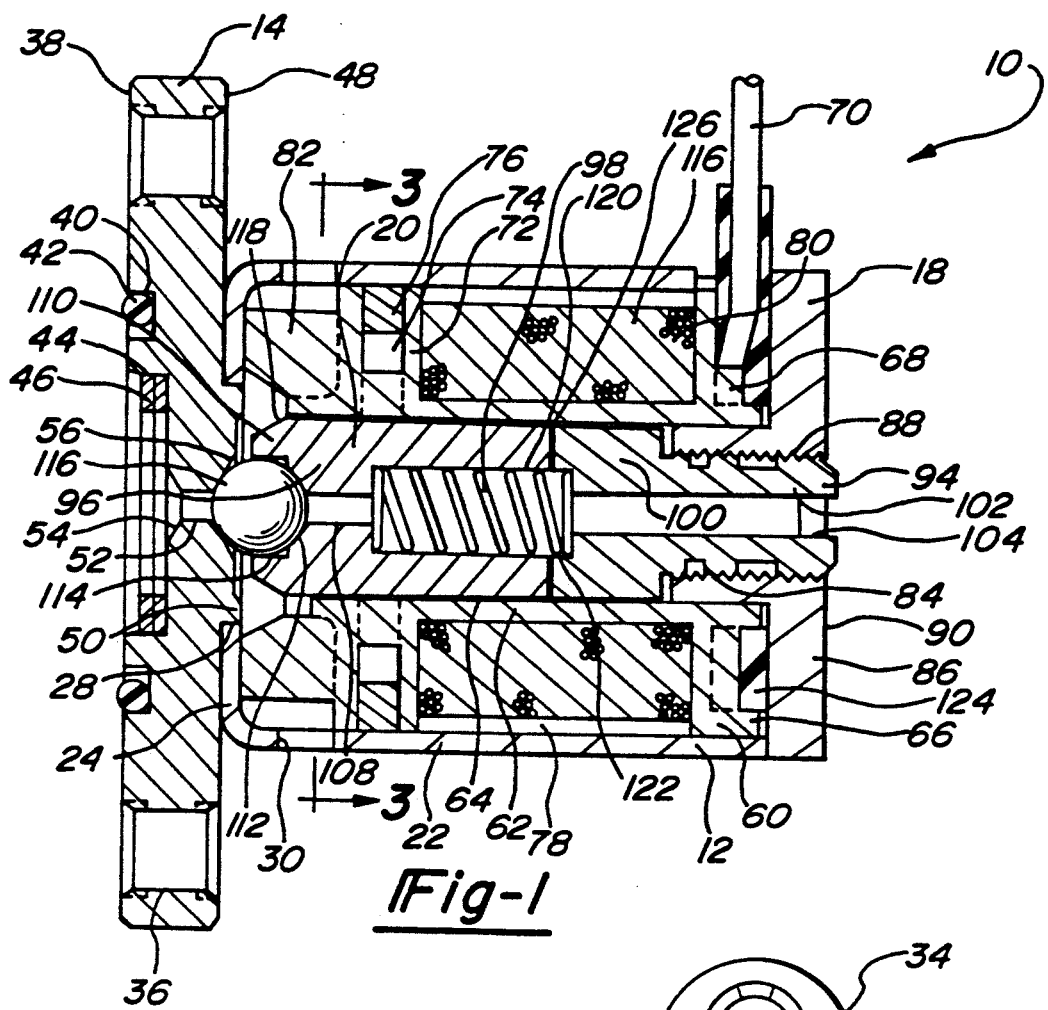
FIG. 1 is a longitudinal cross sectional view of a solenoid valve in accordance with the present invention.
Figure 2:
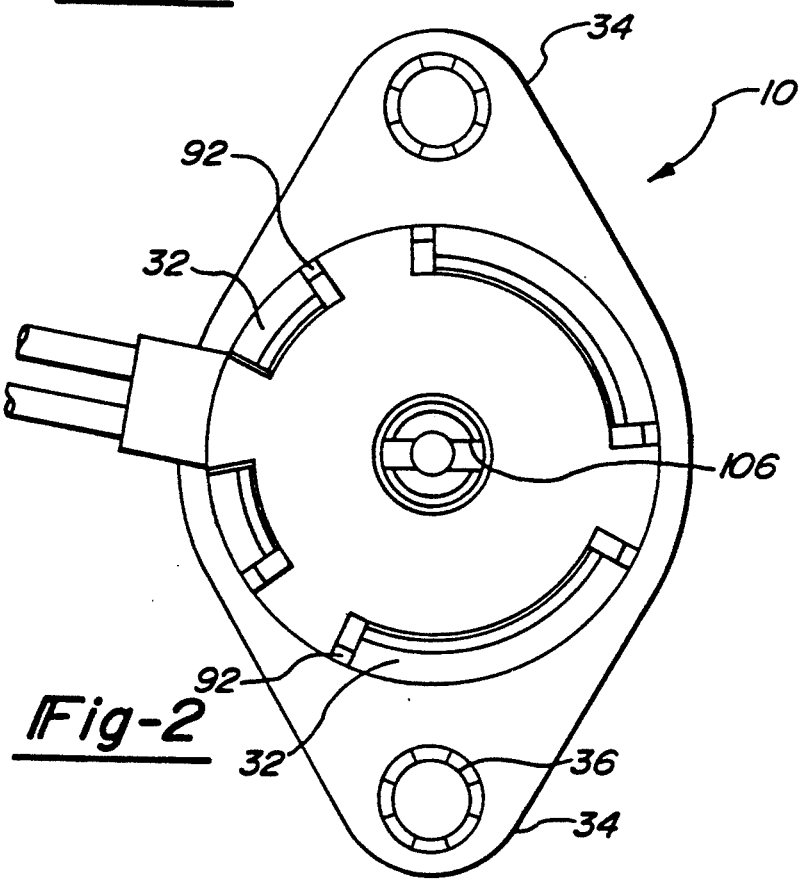
FIG. 2 is an end of the solenoid valve shown in FIG. 1.
Figure 3:
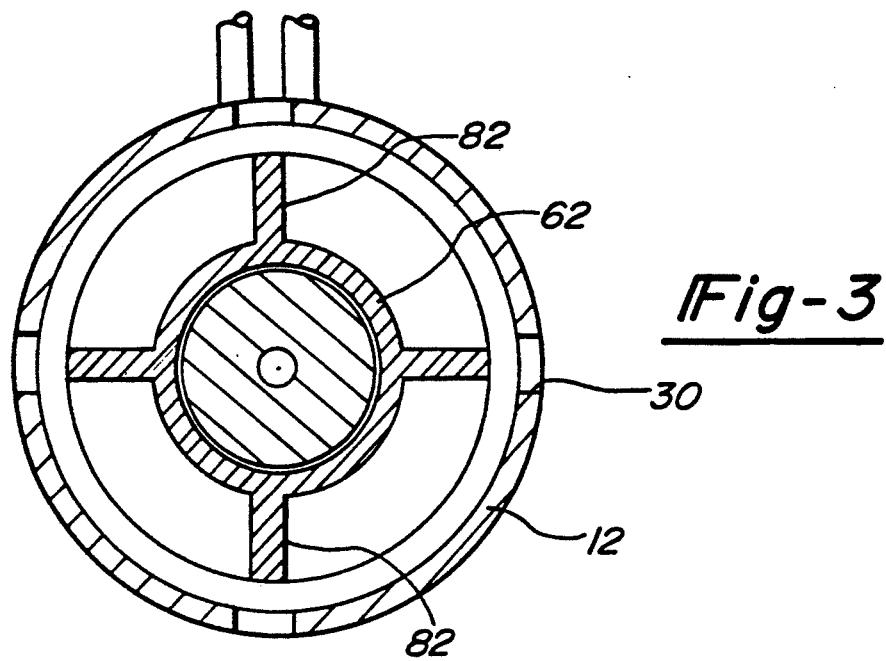
FIG. 3 is a sectional view taken along line 3—3 in FIG. 1.

Referring now to the drawings in which like reference numerals designate like or corresponding parts through the several views, there is shown in FIGS. 1 through 3 a solenoid valve 10 in accordance with the present invention. Solenoid valve 10 comprises a body 12, a cover 14, a coil assembly 16, an end cap 18 and an armature 20. Body 12 is a hollow cylindrical shaped member having a cylindrical shaped wall 22 having a radially inwardly extending wall 24 located at one end thereof. Radially inwardly extending wall 24 has a plurality of formed projections (four in the preferred embodiment) which will be used for projection welding of body 12 to cover 14 as will be described later herein. Radially inwardly extending wall 24 further defines a circular opening 28 which is generally coaxial with cylindrical wall 22. Cylindrical wall 22 is provided with a plurality of radially extending apertures 30 (four in the preferred embodiment) which are used as a passageway for fluid as will be described later herein. The end of cylindrical wall 22 opposite to radially inwardly extending wall 24 is provided with a plurality of axially extending tabs 32 which are used to retain the internal components of the valve as will also be described later herein.

Cover 14 is a generally cylindrical shaped member having a pair of diametrally opposite ears 34 adapted for mounting valve 10 into the appropriate transmission assembly or other apparatus. Cover 14 is preferably manufactured from steel using a powdered metal process. Each ear 34 has a circular bore 36 extending completely through cover 14. Bores 36 accommodate a mounting bolt (not shown) to locate and secure valve 10 in its correct position. One radial face 38 of cover 14 defines an annular cavity 40 which locates an O-ring 42 for the sealing of face 38 upon assembly of valve 10 into the transmission or other apparatus. Face 38 further defines a cylindrical cavity 44 which extends partially into cover 14. A filtering device 46 is positioned within cavity 44 and the edges of cavity 44 can be staked by methods known in the art to retain filtering device 46. The radial face 48 opposite to radial face 38 of cover 14 has an axial extension 50. The diameter of axial extension 50 is slightly less than the diameter of circular opening 28 in body 12 and is used to locate body 12 relative to cover 14 during assembly of valve 10. A centrally located aperture 52 extends through cover 14. The junction between face 38 and aperture 52 is provided with a conical shaped surface 54 which helps to guide the fluid through aperture 52. The junction between face 48 and aperture 52 is provided with a first conical shaped valve seat 56. In order to insure adequate life of solenoid valve 10, seat 56 is induction hardened.

Coil assembly 16 includes a bobbin 60 which has a cylindrical wall 62 defining an internal cavity 64 extending through it. Extending radially outward from one end of cylindrical wall 62 is an annular wall 66. Annular wall 66 has a plurality of circumferentially spaced indentations 68 which are used for providing access for the necessary lead wires 70 to attach to the coil windings of an annular coil 80. A second annular wall 72 spaced from annular wall 66 also extends radially outward from cylindrical wall 62. Second annular wall 72 defines a first annular cavity 74 which supports and locates a pair of sealing washers 76. Sealing washers 76 are semi-circular steel washers which operate to complete the magnetic flux path when the solenoid is energized. Annular wall 66, cylindrical wall 62 and annular wall 72 form a second annular cavity 78. Second annular cavity 78 receives annular coil 80. A plurality of legs 82 extend both radially from cylindrical wall 62 and axially from second annular wall 72 as shown in FIG. 1 for locating coil assembly 16 within body 12.

End cap 18 includes an annular wall 84 having an axially extending cylindrical portion 86. A cylindrical cavity 88 extends axially through annular wall 84 and cylindrical portion 86. The internal surface of cavity 88 is threaded to allow for the necessary adjustment of armature 20. The radial face 90 of end cap 18 is provided with a plurality of circumferentially spaced indentations 92 to provide for the mating surfaces for locating the plurality of tabs 32 of body 12 during assembly of valve 10.

Armature 20 is a three piece assembly comprising an upper armature 94, a lower armature 96 and a biasing spring 98. Upper armature 94 includes a first cylindrical section 100 having a second cylindrical section 102 extending axially therefrom. A cylindrical cavity 104 extends axially through first and second cylindrical sections 100 and 102. The exterior surface of second cylindrical section 102 is threaded for mating with the threaded internal surface of cavity 88 to provide the necessary adjustment of armature 20. The end of second cylindrical section 102 opposite to first cylindrical section 100 has a slot 106 which is provided to facilitate the necessary adjustment of the air gap during the assembly of valve 10. Lower armature 96 is a cylindrical shaped member having a cylindrical cavity 108 extending axially through lower armature 96. One end 110 of lower armature 96 defines a second conical shaped valve seat 112. A cylindrical cavity 114 is provided between valve seat 112 and the end 110 of lower armature 96 to provide for the nesting of a ball 116. The periphery of end 110 of armature 96 is tapered as at 118 to facilitate the flow of magnetic lines of flux when the solenoid is energized. The end of armature 96 opposite to end 110 has an enlarged cylindrical cavity 120 for locating spring 98. Spring 98 is a coil spring located in cavity 120 and extends into a cylindrical cavity 122 located in upper armature 94. Cavity 122 is similar in diameter to cavity 120 but as shown in FIG. 1, cavity 122 is shallower in depth. The depth of cavities 120 and 122 can be varied as long as the total depth of both cavities does not exceed the working length of spring 98. Spring 98 bears against upper armature 94 and biases lower armature 96 away from upper armature 94.

The assembly of solenoid valve 10 begins with body 12 being assembled to cover 14 by positioning circular opening 28 around axial extension 50 and projection welding cover 12 to radial face 48 using the plurality of formed projections by methods known well in the art. Next, coil assembly 16 is positioned within hollow cylindrical body 12 with the plurality of legs 82 coming to rest on the radially inwardly extending wall 24 of body 12. The outside diameter of annular wall 66 and 72 of coil assembly 16 are dimensioned to provide a slip fit inside cylindrical shaped wall 22 of body 12. Washers 76 completes the magnetic flux path between the cylindrical body 12 and coil assembly 16 when the solenoid is energized. Once coil assembly 16 is positioned, ball 116, lower armature 96, spring 98 and upper armature 94 are assembled into internal cavity 64 of coil assembly 16. The outside diameter of both upper and lower armatures 94 and 96 are sized to provide a freely sliding relationship with internal cavity 64. The above components are assembled into internal cavity 64 such that ball 116 is positioned between first conical seat 56 of cover 14 and second conical seat 112 of lower armature 96. Spring 98 is positioned in cylindrical cavity 120 of lower armature 96 and upper armature 94 is located within internal cavity 64 and positioned such that the upper end of spring 98 is located in cylindrical cavity 122 of upper armature 94.

End cap 18 is then threadably engaged with upper armature 94 and end cap 18 is located such that tabs 32 of body 12 can be roll crimped into an associated indentation 92 located on radial face 90 of end cap 18. A sealing member 124 is provided between end cap 18 and coil assembly 16 to seal the internal components of solenoid valve 10 from the outside environment. Once roll crimped into position, a specified air gap 126 is provided between upper and lower armatures 94 and 96 by adjusting the position of upper armature 94 by using the threaded connection between upper armature 94 and end cap 18. Once air gap 126 has been set, upper armature 94 is staked in place by methods well known in the art to maintain the proper air gap during operation of the solenoid valve. Air gap 126 thus allows for the limited axial movement of lower armature 96 and ball 116. Prior to assembly of solenoid valve 10 into the transmission or apparatus, filtering device 46 is positioned in cylindrical cavity 44 and staked in place by methods well known in the art if necessary and O-ring 42 is positioned into annular cavity 40.

The flux can be best visualized by reference to FIG. 1. Magnetic flux induced by coil 80 will follow a path through lower armature 96, through second annular wall 72 of coil assembly 16, through the pair of washers 76, through body 12, through first annular wall 66 of coil assembly 16, through end cap 18, through upper armature 94, across the air gap between upper armature 94 and lower armature 96 and back into lower armature 96. Cover 14 being made from a magnetic material will not have a significant effect on the path of the magnetic flux, as the magnetic flux will have a tendency to be centered around coil 80 with only a small amount of magnetic flux leaking into cover 14.

Once assembled into the transmission in either a pulse width modulated capacity or in an on/off capacity, solenoid valve 10 is normally closed. This is caused by lower armature 96 and ball 116 being forced against valve seat 56 by the force exerted by coil spring 98. When power is supplied to coil 80, lower armature 96 and ball 116 are attracted towards upper armature 94. This allows fluid to flow form cavity 44 of cover 14 through aperture 52 into the hollow cylindrical body 12. The fluid flows around the plurality of legs 82 of coil assembly 16 and exits the hollow cylindrical body 12 through the plurality of radially extending apertures 30 in wall 22. When power is terminated, coil spring 98 urges lower armature 96 and ball 116 against valve seat 56 closing the valve.

While the above detailed description describes the preferred embodiment of the present invention, it should be understood that the present invention is susceptible to modification, variation and alteration without deviating from the scope and fair meaning of the subjoined claims.

What is claimed is:

1. A solenoid valve comprising:
    a cylindrical body having an outside wall defining an internal cavity, said body having a radially inwardly extending end wall disposed at one end, said body further defining a plurality of radially extending apertures extending through said outside wall of said body;
    a cover fixedly secured to said end wall of said body, said cover having an axial passageway extending through said cover and communicating with said internal cavity of said body, said cover defining a valve seat adjacent to said internal cavity of said body;
    an end cap fixedly secured to the opposite end of said body, said end cap having a centrally disposed bore;
    an upper armature fixedly secured in said bore of said end cap, said upper armature extending into said internal cavity;
    a lower armature disposed within said internal cavity between said upper armature and said end cap, said upper and lower armatures and said body defining an annular space between said upper and lower armatures and said body;
    a ball disposed within said internal cavity between said lower armature and said end cap;
    biasing means disposed between said upper and lower armatures, said biasing means urging said ball into engagement with said valve seat;
    a coil assembly disposed within said annular space such that when fluid is applied to said axial passage of said cover and said coil assembly is de-energized, said biasing means holds said ball against said valve seat and prevents flow through said axial passage, and when said coil assembly is energized, said ball and said lower armature are drawn toward said upper armature to permit flow from said axial passage into said internal cavity and through said plurality of radially extending apertures of said body:
    wherein said cylindrical body is projection welded to said cover.

2. The solenoid valve of claim 1 wherein said cover has means for mounting said solenoid valve to a housing.

3. A solenoid valve comprising:
    a cylindrical body having an outside wall defining an internal cavity, said body having a radially inwardly extending end wall disposed at one end, said body further defining a plurality of radially extending apertures extending through said outside wall of said body;
    a cover fixedly secured to said end wall of said body, said cover having an axial passageway extending through said cover and communicating with said internal cavity of said body, said cover defining a valve seat adjacent to said internal cavity of said body;
    an end cap fixedly secured to the opposite end of said body, said end cap having a centrally disposed bore;
    an upper armature fixedly secured in said bore of said end cap, said upper armature extending into said internal cavity;
    a lower armature disposed within said internal cavity between said upper armature and said end cap, said upper and lower armatures and said body defining an annular space between said upper and lower armatures and said body;
    a ball disposed within said internal cavity between said lower armature and said end cap;
    biasing means disposed between said upper and lower armatures, said biasing means urging said ball into engagement with said valve seat;
    a coil assembly disposed within said annular space such that when fluid is applied to said axial passage of said cover and said coil assembly is de-energized, said biasing means holds said ball against said valve seat and prevents flow through said axial passage, and when said coil assembly is energized, said ball and said lower armature are drawn toward said upper armature to permit flow from said axial passage into said internal cavity and through said plurality of radially extending apertures of said body;
    wherein said upper armature is threadably received into said end cap.

4. The solenoid valve of claim 3 wherein said upper armature is staked to prevent rotation of said upper armature with respect to said end cap.

5. The solenoid valve of claim 1 wherein said valve seat of said cover is induction hardened.

6. The solenoid valve of claim 1 wherein said biasing means includes a coil spring disposed in a pocket in said lower armature.

7. A solenoid valve comprising:
    a cylindrical body having an outside wall defining an internal cavity, said body having a radially inwardly extending end wall disposed at one end, said body further defining a plurality of radially extending apertures extending through said outside wall of said body;
    a cover fixedly secured to said end wall of said body, said cover having an axial passageway extending through said cover and communicating with said internal cavity of said body, said cover defining a valve seat adjacent to said internal cavity of said body;
    an end cap fixedly secured to the opposite end of said body, said end cap having a centrally disposed bore;
    an upper armature fixedly secured in said bore of said end cap, said upper armature extending into said internal cavity;
    a lower armature disposed within said internal cavity between said upper armature and said end cap, said upper and lower armatures and said body defining an annular space between said upper and lower armatures and said body;

a ball disposed within said internal cavity between said lower armature and said end cap;

biasing means disposed between said upper and lower armatures, said biasing means urging said ball into engagement with said valve seat;

a coil assembly disposed within said annular space such that when fluid is applied to said axial passage of said cover and said coil assembly is de-energized, said biasing means holds said ball against said valve seat and prevents flow through said axial passage, and when said coil assembly is energized, said ball and said lower armature are drawn toward said upper armature to permit flow from said axial passage into said internal cavity and through said plurality of radially extending apertures of said body wherein said coil assembly comprises:

a bobbin disposed within said annular space and defining an annular cavity between said bobbin and said body;

a coil disposed within said annular cavity;

a pair of washers disposed between said bobbin and said body; said washers operative to complete the path of the magnetic flux of said coil when said coil is energized.

8. The solenoid valve of claim 7 wherein said bobbin has a plurality of legs extending from said bobbin and engaging said end wall of said body, said legs providing a path for said fluid between said axial passage and said plurality of radially extending apertures when said coil is energized.

9. The solenoid valve of claim 1 wherein said cover has a filter disposed within said axial passageway.

10. The solenoid valve of claim 1 wherein said cover is made from powdered metal.

11. The solenoid valve of claim 3 wherein said cover has means for mounting said solenoid valve to a housing.

12. The solenoid valve of claim 3 wherein said valve seat of said cover is induction hardened.

13. The solenoid valve of claim 3 wherein said biasing means includes a coil spring disposed in a pocket in said lower armature.

14. The solenoid valve of claim 3 wherein said cover has a filter disposed within said axial passageway.

15. The solenoid valve of claim 3 wherein said cover is made from powdered metal.

16. The solenoid valve of claim 7 wherein said cover has means for mounting said solenoid valve to a housing.

17. The solenoid valve of claim 7 wherein said valve seat of said cover is induction hardened.

18. The solenoid valve of claim 7 wherein said biasing means includes a coil spring disposed in a pocket in said lower armature.

19. The solenoid valve of claim 7 wherein said cover has a filter disposed within said axial passageway.

20. The solenoid valve of claim 7 wherein said cover is made from powdered metal.

* * * * *